US005608783A

United States Patent [19]
Ichnowski et al.

[11] Patent Number: 5,608,783
[45] Date of Patent: Mar. 4, 1997

[54] METHODS AND APPARATUS FOR COORDINATING AND CONTROLLING THE OPERATION OF AMIS ANALOG VOICE MESSAGING SYSTEM NETWORKS IN RESPONSE TO MESSAGE DELIVERY SESSION STATUS SIGNALS

[75] Inventors: Jeanne Ichnowski, Palo Alto; Chris Yuan, Fremont; Bipin Patel, San Jose; Mark E. Kaminsky, Sunnyvale, all of Calif.

[73] Assignee: Siemens Business Communication Systems, Inc., Santa Clara, Calif.

[21] Appl. No.: 650,066

[22] Filed: May 16, 1996

Related U.S. Application Data

[63] Continuation of Ser. No. 400,772, Mar. 6, 1995, abandoned, which is a continuation of Ser. No. 92,185, Jul. 15, 1993, abandoned.

[51] Int. Cl.⁶ .................................................. H04M 3/50
[52] U.S. Cl. ................................................ 379/67; 379/88
[58] Field of Search ................................. 379/67, 69, 88, 379/89, 100; 395/200, 325, 500; 364/228

[56] References Cited

U.S. PATENT DOCUMENTS

| | | | |
|---|---|---|---|
| 3,958,088 | 5/1976 | Vieri | 178/3 X |
| 4,406,925 | 9/1983 | Jordan et al. | 379/69 X |
| 4,790,003 | 12/1988 | Kepley et al. | 379/142 X |
| 4,920,560 | 4/1990 | Kageyama | 379/100 |
| 4,941,168 | 7/1990 | Kelly, Jr. | 379/69 |
| 5,027,273 | 6/1991 | Letwin | 364/200 |
| 5,195,128 | 3/1993 | Knitl | 379/88 X |
| 5,274,696 | 12/1993 | Perelman | 379/89 |
| 5,291,546 | 3/1994 | Giler et al. | 379/100 |
| 5,325,536 | 6/1994 | Chang et al. | 395/725 |

OTHER PUBLICATIONS

AMIS—Analog Protocol, Ver 1 Issue 2 Feb. 1992.

*Primary Examiner*—Ahmad F. Matar
*Assistant Examiner*—Daniel S. Hunter

[57] ABSTRACT

A method is provided for coordinating and controlling the execution of processes related to internetworked voice mail communications. In the method of the invention, status signals defined by an internetworking protocol and representing status information respecting the transfer of voice mail messages between dissimilar voice mail networks are operated on by one or more of the internetworked voice mail networks in a manner to cause such signals to be translated to processes carried out by such an internetworked voice mail network, such processes being generally of a character to provide information or functions useful to operators and/or users of such a voice mail network.

21 Claims, 4 Drawing Sheets

| EXCHANGE STATUS | RETRY | INFORMATION PROMPT | STATISTIC PEGGED | MESSAGE LOG CODE |
|---|---|---|---|---|
| HUMAN ANSWER | NO | "NUMBER IS NOT AMIS DESTINATION" PROMPT 220 | HUMAN ANSWER | 0010 |
| BUSY | YES | "CALL COULD NOT BE COMPLETED" PROMPT 230 | DESTINATION BUSY | 0020 |
| DISCONNECT | YES | "CALL COULD NOT BE COMPLETED" PROMPT 230 | DESTINATION ABORTS | 0023 |
| NETWORK DOWN | YES | "DESTINATION NOT ACCEPT MESSAGE" PROMPT 331 | DESTINATION DOWN | 0031 |
| RESTRICTED ACCESS | NO | "DESTINATION NOT ACCEPT MESSAGE" PROMPT 331 | RESTRICTED ACCESS | 0040 |
| MAILBOX FULL | NO | "DESTINATION MAILBOX IS FULL" PROMPT 390 | DESTINATION MAILBOX | 0050 |
| MAILBOX NOT ACCEPTING | NO | "DESTINATION IS NOT ACCEPTING" PROMPT 380 | DESTINATION NOT ACCEPTING | 0052 |
| FRAME ERROR | YES | "CALL COULD NOT BE COMPLETED" PROMPT 230 | ERROR WHILE SENDING | 0081 |
| PROTOCOL ERROR | YES | "CALL COULD NOT BE COMPLETED" PROMPT 230 | ERROR WHILE SENDING | 0082 |
| MESSAGE SENT | N/A | NONE | MESSAGES SENT | 0001 |
| MESSAGE RECEIVED | N/A | NONE | MESSAGES RECEIVED | 1001 |
| ORIGINATING HANG UP | N/A | NONE | ORIGINATING SYSTEM ABORTS | 1020 |
| OUR DISK FULL | N/A | NONE | OUR DISK FULL | 1030 |
| OUR MAILBOX FULL | N/A | NONE | OUR MAILBOX FULL | 1050 |
| PROTOCOL VIOLATION | N/A | NONE | ERROR WHILE RECEIVING | 1087 |

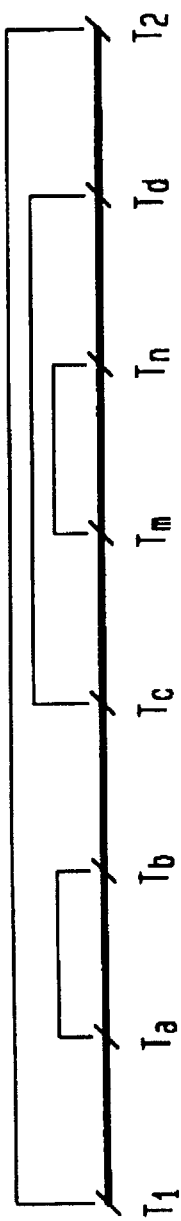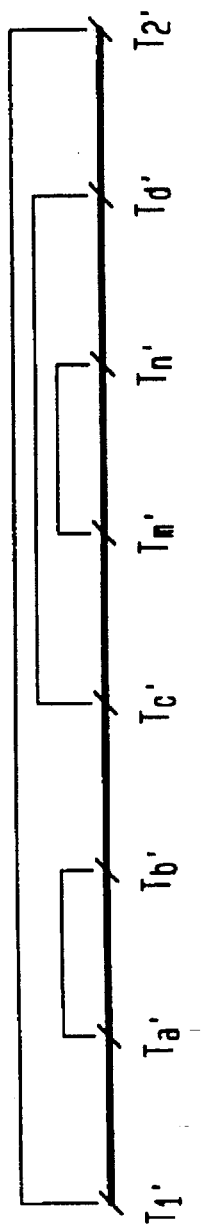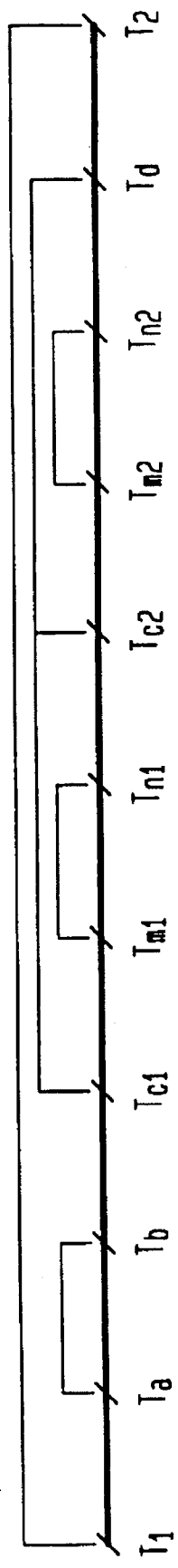

FIG. 5

| EXCHANGE STATUS | RETRY | INFORMATION PROMPT | STATISTIC PEGGED | MESSAGE LOG CODE |
|---|---|---|---|---|
| HUMAN ANSWER | NO | "NUMBER IS NOT AMIS DESTINATION" PROMPT 220 | HUMAN ANSWER | 0010 |
| BUSY | YES | "CALL COULD NOT BE COMPLETED" PROMPT 230 | DESTINATION BUSY | 0020 |
| DISCONNECT | YES | "CALL COULD NOT BE COMPLETED" PROMPT 230 | DESTINATION ABORTS | 0023 |
| NETWORK DOWN | YES | "DESTINATION NOT ACCEPT MESSAGE" PROMPT 331 | DESTINATION DOWN | 0031 |
| RESTRICTED ACCESS | NO | "DESTINATION NOT ACCEPT MESSAGE" PROMPT 331 | RESTRICTED ACCESS | 0040 |
| MAILBOX FULL | NO | "DESTINATION MAILBOX IS FULL" PROMPT 390 | DESTINATION MAILBOX | 0050 |
| MAILBOX NOT ACCEPTING | NO | "DESTINATION IS NOT ACCEPTING" PROMPT 380 | DESTINATION NOT ACCEPTING | 0052 |
| FRAME ERROR | YES | "CALL COULD NOT BE COMPLETED" PROMPT 230 | ERROR WHILE SENDING | 0081 |
| PROTOCOL ERROR | YES | "CALL COULD NOT BE COMPLETED" PROMPT 230 | ERROR WHILE SENDING | 0082 |
| MESSAGE SENT | N/A | NONE | MESSAGES SENT | 0001 |
| MESSAGE RECEIVED | N/A | NONE | MESSAGES RECEIVED | 1001 |
| ORIGINATING HANG UP | N/A | NONE | ORIGINATING SYSTEM ABORTS | 1020 |
| OUR DISK FULL | N/A | NONE | OUR DISK FULL | 1030 |
| OUR MAILBOX FULL | N/A | NONE | OUR MAILBOX FULL | 1050 |
| PROTOCOL VIOLATION | N/A | NONE | ERROR WHILE RECEIVING | 1087 |

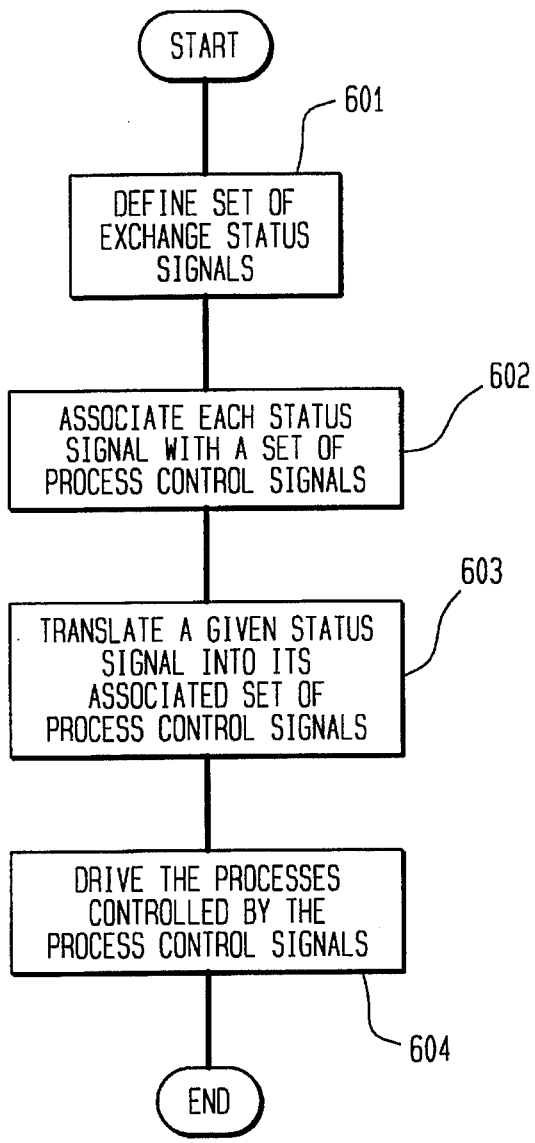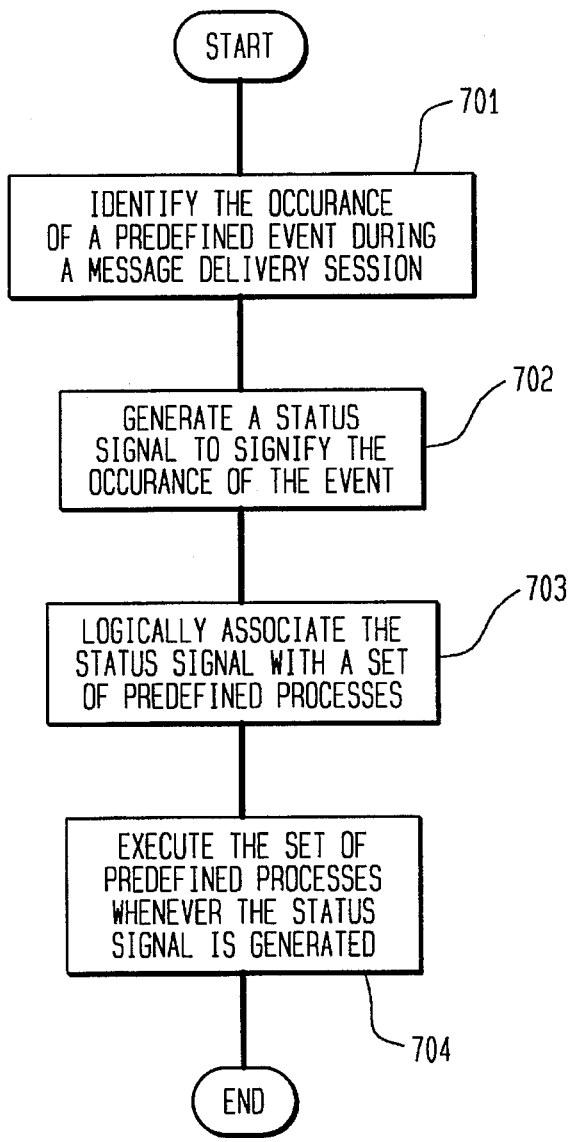

METHODS AND APPARATUS FOR COORDINATING AND CONTROLLING THE OPERATION OF AMIS ANALOG VOICE MESSAGING SYSTEM NETWORKS IN RESPONSE TO MESSAGE DELIVERY SESSION STATUS SIGNALS

CROSS-REFERENCE TO RELATED APPLICATION

This is a continuation of Ser. No. 08/400,772 filed Mar. 6, 1995, now abandoned, which is a continuation of Ser. No. 08/092,185 filed Jul. 15, 1993, now abandoned.

BACKGROUND OF THE INVENTION

1. Field of the Invention

The invention relates generally to voice messaging ("VM") system networks that support the Audio Messaging Interface Specification (AMIS) Analog Protocol. Such networks enable VM systems manufactured by different vendors to communicate in an open network (sometimes referred to herein as an "open access") environment.

More particularly, the invention relates to methods and apparatus for coordinating and controlling the execution of predefined VM system specific and/or protocol mandated processes in response to predefined signals which indicate the status of an AMIS Analog "Message Delivery Session". Each such session, as defined herein, is a single connection between voice message systems during which one or more messages, with accompanying protocol information, may be transmitted from an originator to an intended recipient.

An example of an event reported in the form of a status signal (sometimes referred to herein as an "exchange" status signal) that is processed by an originating system is a "destination busy" signal occurring during call set up; an example of an event reported in the form of status signal that is processed by both an originating and destination system is a "successful message delivery" signal; an example of an event reported in the form of status signal that is processed by a destination system is a signal indicating that the "originating system has hung up", etc. Again, as indicated hereinabove, each such event has a predefined status signal associated therewith in VM system networks in which the invention may be practiced.

The invention may be used in commercially available voice messaging system networks that support the AMIS Analog protocol, such as the Rolm™ PhoneMail™ VM system network. The invention is described herein, for the sake of illustration only, in the context of the PhoneMail VM system network.

2. Definitions

"Address"—A means by which the system and mailbox of a message originator and recipient are identified using the AMIS Analog Protocol. The form of the input from the originator identifying the intended recipient is locally defined. However, the address used in identifying the originator must have two parts: a System Number and a Mailbox ID.

"AMIS"—Audio Message Interchange Specification—A specification of the interaction between two systems for the purposes of exchanging voice messages via a common networking protocol. Unless otherwise indicated, it is used herein to reference the AMIS Analog Protocol described in the publication entitled "Audio Messaging Interchange Specification (AMIS)—Analog Protocol", Version 1, Issue 2, published in February, 1992, by the Information Industry Association, Washington, D.C.

"AMIS Analog Networking"—A networking scheme in which voice messages are transmitted in analog form between two systems and which involves the use of analog (DTMF) signals to convey protocol information. Messages and data are sent over switched or dedicated telephone lines.

"Dedicated Circuit"—A circuit, most often provided by a common carrier, which is used solely by the purchaser in the AMIS context, for the purpose of providing a transmission path between two VM systems. Such circuits are also called "TIE" lines.

"Destination System"—A system to which a message or control information is being sent.

"DTMF"—Dual Tone Multi-Frequency. The method of signalling in which each digit or symbol is uniquely represented by a standard combination of two tones. Each tone is comprised of two frequencies from one of two exclusive groups. For AMIS, the required tones are 0–9, *, #, C, and D.

"Frame"—A unit of information transferred, normally containing data plus control information in the form of an "envelope" of DTMF tones. There are two basic AMIS frame types, Data and Response, as defined in the AMIS Analog Specification.

"International Direct Distance Dialing (IDDD)"—The international form of Direct Distance Dialing. An IDDD number consists in its full form of a Country Code (CC) plus the National Significant Number (NSN). The NSN in turn consists of a trunk code (equivalent to the U.S. Area Code) and Subscriber Number. The maximum length of the CC plus NSN is twelve digits. The current maximum length of the CC alone is three digits. The IDDD number is the normal way of identifying a "System Number", as defined hereinafter "Inter-Vendor Networking"—The mechanisms by which systems produced by different manufacturers network with each other. This is a key objective of the AMIS.

"Mailbox"—A logical abstraction referring to the locations in the system in which a recipient's messages are stored, and which are seen by a recipient as a single logical storage area.

"Mailbox ID"—The portion of an AMIS Analog Protocol address in a message that identifies the mailbox of the originator/recipient, consisting of 1–16 digits.

"Message"—A generic term referring to the audio information sent over a VM system network.

"Open Access"—Refers to the ability of a user on one AMIS system to send messages to a user on another AMIS system, and the recipient user to send a reply back to the originator, without any prearranged configuration of the respective systems, such as the exchange of passwords.

"Originator"—The user who initiates a voice message (also called the Sender). Where necessary, the AMIS Analog Protocol distinguishes between the user and his/her system, referring to the latter as the "Originating" (or Sending) System.

"PSTN"—Abbreviation for the public switched telephone network.

"Receive"—One of the basic AMIS Analog Protocol messaging functions. The function by which a destination system accepts a message and stores it in the mailbox of the intended recipient.

"Recipient"—The user who receives a voice message. Where necessary, the AMIS Analog Protocol distinguishes between the recipient and his/her system, referring to the latter as the Destination System.

"Reply"—One of the basic AMIS Analog Protocol messaging functions. The function in which a message recipient may respond to the message without having to input the originator's address.

"Send"—One of the basic AMIS Analog Protocol messaging functions. The function in which a message originator directs the originating system to send a message to a designated recipient.

"Session"—A single connection between voice message systems, during which one or more messages, with accompanying protocol information, are transmitted from the originator to the intended recipient; also referred to herein as an "AMIS Analog Message Delivery Session".

"Subscriber"—Another name for a User with a mailbox on a system.

"System Number"—The portion of an AMIS Analog Protocol address that identifies the originating system. It consists of the International Direct Distance Dialing (IDDD) number by which the system can be reached over the PSTN, with variations to handle special cases such as private network dialing.

"User"—A person utilizing a voice message system; in the AMIS connection, a person who is executing AMIS-visible actions (e.g., Send or Receive) on a message.

3. Description of the Prior Art

Voice messaging ("VM") has become a service that users of all sizes and disciplines have come to rely on as a critical communications tool. Voice messaging is an application that allows customers to record and distribute voice messages to one or more voice mailboxes for retrieval by the destination party or parties. The user enters the VM system, records a message, specifies message delivery options and recipient addresses based on the available features of the particular VM system, and exits the system. The VM system then delivers the recorded message to the recipients' mailboxes, and in some cases notifies the recipients of the waiting message.

The voice messaging industry has advanced significantly in the last few years. One aspect of that advancement has been the emergence of VM system networking, which extends the voice messaging capabilities beyond the boundary of a single VM system by providing transfer of messages between VM systems. Networking allows an organization to more efficiently and effectively transfer information via voice messaging throughout an organization. For example, VM system networking may link several departments of a large institution, branch offices with corporate headquarters, or small offices in geographically dispersed locations.

Until recently, a given VM system network has involved only systems produced by a single vendor. There is, however, a growing need for the networking of multiple vendors' systems. For instance, as corporations grow though acquisitions, they may find that the companies they have acquired utilize voice messaging systems from different vendors. In other cases, the individual departmental VM system purchases, made before the need for corporate-wide networking was apparent, have led to the purchases of different vendors' systems which must later be made to network. Additionally there is a growing need for corporations to extend their networking boundaries to voice messaging users in other companies. Finally, service providers are also beginning to implement service to individual users that will expect networking with other users in much the same way the public telephone network links them together today.

The Audio Messaging Interchange Specification (AMIS) describes how different vendors' systems can network. Two different AMIS protocols have been developed, responding to a perceived dichotomy in the needs of the voice messaging industry; an AMIS analog networking protocol and an AMIS digital networking protocol.

With a digital scheme, both control signaling and message transmission are done in digital form. To address the needs of small system users and vendors, an alternative analog protocol specification has been developed. The previously described AMIS Analog Protocol uses Dual-Tone, Multifrequency (DTMF) signaling, and message transmission in analog form.

It is in VM networks which support the analog protocol version of the AMIS, that the present invention finds application. Accordingly, the remainder of this background section will focus on the AMIS Analog Protocol per se and desirable features for incorporation in systems supporting the AMIS Analog Protocol.

As indicated hereinabove, the AMIS Analog Protocol provides a mechanism for transferring voice messages among VM systems with similar functions, but different architectures and technologies. It provides defined formats for identifying message originators and recipients, addressing messages, and sending, receiving, and replying to messages. Also, as indicated hereinbefore, signaling is done using DTMF tones, and the actual message is transmitted in analog form.

The primary goal of AMIS Analog Protocol was to provide open access networking. Open access means that a user on any VM system that supports the specification can send a message to a user on any other VM system that also supports the specification, and the second user can send a reply message to the first user, without prearranged configuration of the respective systems. The AMIS Analog Protocol is therefore designed for use on the public switched telephone network (PSTN), although it may be used with private TIE lines as well.

Systems may typically access the PSTN via dial-up ports that are addressed using International Direct Distance Dialing (IDDD) telephone numbers (DDD for calls within North America). The use of the established worldwide telephone network ensures universal access.

Another key objective of the AMIS Analog Protocol was to provide a mechanism for meeting the needs of small system users and vendors. Small systems have lower traffic volumes that cannot justify the costs of specialized networking equipment and software. The AMIS Analog Protocol therefore uses analog dual tone multi-frequency (DTMF) control signaling and analog audio message transmission. Since these signaling and transmission capabilities are provided in all common systems, no additional networking equipment is required.

In general, the AMIS Analog Protocol exchange is timing dependent with the protocol itself providing some error checking capabilities.

The protocol also prescribes specific actions to be taken by the supporting VM system network whenever a message is not delivered. The actions taken depend on the reason for the message delivery failure during a given Message Delivery Session. In general, these actions are (1) attempt a redelivery, or (2) return the message and indicate to the user the reason for non-delivery.

Local system characteristics and requirements also dictate what to do if problems are encountered at any time during an AMIS Analog Message Delivery Session; that is, during the performance of any of the well known tasks defined to take place during a Message Delivery Session, namely, during call set up and the protocol data exchange per se (where the protocol data exchange includes actual message transmission).

In particular, the aforementioned PhoneMail implementation of the AMIS Analog protocol requires that statistics associated with AMIS message exchanges be gathered and that a detailed log, which tracks messaging activity, be maintained.

It should be noted that the protocol data exchange used in the illustrative Phonemail network, referred to hereinabove, includes the following well known subtasks: (a) start session data frame transmission/acknowledgement (allowing the originating and destination systems to agree on the version of the protocol being used); (b) originating system ID transmission/acknowledgement (allowing the originating system to identify itself to the destination system and enabling the destination system to screen calls and send replies); (c) message information transmission/acknowledgement (enabling message specific information which indicates message destination and source to be exchanged; and which also provides the destination system with information necessary to determine whether a target mailbox can accept messages); (d) actual message transmission from the originating system to the destination system, including receipt acknowledgement; and (e) sign off (for terminating the session).

In the illustrative PhoneMail context, if a single message scheduled for delivery encounters a problem (such as a busy line, full mailbox, etc.) at any time during the Session (call set up or protocol exchange, including message transmission), a status signal is generated. It should also be noted that a status signal is generated by PhoneMail whenever a message is successfully delivered.

It should be further noted that, in accordance with the AMIS Analog protocol, VM systems such as Phonemail allow for the possibility of sending two or more messages after the AMIS Analog Message Delivery Session communications link is established by the call set up process. In this environment at least one status signal is generated for each message.

In the illustrative PhoneMail context in which the invention is being described, a Message Delivery Session that includes the scheduled delivery of two or more messages, may continue after the failure to deliver a given message so long as no redelivery action (i.e., a retry at delivering the failed message) is indicated by the protocol or locally defined rules.

For example, in the PhoneMail context, attempting to deliver a message to a full mailbox would result in a failure to deliver the message and a prompt would be used to inform the sender of the failure condition; however, in this situation, no retry (redelivery attempt) is called for in PhoneMail and the Message Delivery Session can continue if there are more messages to deliver.

In the PhoneMail context, a specified retry action results in the Message Delivery Session ending with the failed message. This would happen, for example, when a framing error is encountered. In fact, in the PhoneMail context (being described in some detail herein for the sake of illustrating an environment in which the invention finds utility), the retry process assumes that the Message Delivery Session during which the failed message was to be delivered, has ended.

In view of the many different types of actions (for example, playing a prompt, attempting to redeliver a message, logging statistics, etc.), that may be required depending on the reason that a given status signal is generated, it would be desirable to provide methods and apparatus for easily identifying reasons for the generation of the status signal, measuring the progress of a given Message Delivery Session, initiating associated actions required by the AMIS Analog protocol, and coordinating and controlling other activities specific to the particular VM system being used (such as PhoneMail) to implement the AMIS Analog protocol.

Furthermore, it would be desirable to provide methods and apparatus which facilitate the development of VM systems (like PhoneMail) that support the AMIS Analog protocol. As indicated hereinbefore, there are many reasons AMIS message delivery may be unsuccessful and each may require a different set of actions. When designing a software architecture to implement the set of required actions, separate software elements (usually implemented by different individuals) make it important to provide a mechanism for coordinating and controlling the execution of such elements to avoid operating errors and to use computing resources efficiently.

Furthermore, should protocol specifications change or new protocols be introduced for support by existing VM systems, it would be desirable to provide methods and apparatus which facilitate supporting, coordinating and controlling any new actions required by the revised or newly introduced protocol, where the actions are to be taken in response to the generation of the aforementioned (or revised) status signals associated with Message Delivery Session activity.

SUMMARY OF THE INVENTION

Accordingly, it is a general object of the invention to provide methods and apparatus which facilitate coordinating and controlling the operation of voice messaging system networks which support the AMIS Analog protocol. In particular, it is the primary object of the invention to provide methods and apparatus which facilitate coordinating and controlling the operation of such networks in response to Message Delivery Session exchange status signals.

It is a further object of the invention to provide methods and apparatus which conveniently enable the reason or reasons for exchange status signal generation (generated as a result of activity taking place during a given Message Delivery Session), to be identified.

It is yet another object of the invention to provide methods and apparatus which define a set of exchange status signals, where each status signal uniquely corresponds to a predetermined event that may take place during an AMIS Analog Message Delivery Session; and which associate each status signal with a set of process control signals that may be used for driving a set of predefined processes required by either the protocol, the local VM system, or both.

Still another object of the invention is to provide methods and apparatus which facilitate translating a given exchange status signal into its associated set of process control signals in order to enable the processes in the aforementioned set of predefined processes to be driven.

Yet another object of the invention is to provide methods and apparatus for measuring the progress of a given Message Delivery Session in order to initiate associated actions required by the AMIS Analog protocol and/or the local VM system, where the actions depend on events that occur during the progress of the Message Delivery Session.

Furthermore yet, it is an object of the invention to provide methods and apparatus which facilitate the development of VM systems (like PhoneMail) that support the AMIS Analog protocol and which facilitate supporting, coordinating and controlling any new actions required by a revised or newly introduced protocol, where the actions are to be taken in response to the generation of status signals associated with Message Delivery Session activity.

According to one aspect of the invention, each predefined status signal uniquely corresponds to a predetermined event that may take place during an AMIS Analog Message Delivery Session, and each such status signal may be used to coordinate and control a set of responses (in the form of predefined processes) to a given event.

As indicated hereinabove, the events for which status signals are defined require some form of VM system action, such as playing a prerecorded prompt, attempting to resend a message, making a record of the status information for statistical purposes, etc. The status signals are usually generated by some form of VM output handler (a controller for the originating system), and input handler (a controller for the destination system) which recognize the occurrence of an event.

Furthermore, according to another aspect of the invention, each status signal generated by one of the aforementioned controllers is translated into a set of process control signals which may be used for driving (selecting and/or providing inputs to) a set of predefined processes, thereby controlling and coordinating their execution. These processes could result, for example, in the aforementioned playing of prompts, recording of message delivery statistics, etc.

According to a specific aspect of the invention, a method (and corresponding apparatus) for coordinating and controlling the operation of a voice messaging system network that supports the AMIS Analog protocol in response to Message Delivery Session status signals, comprises the steps of: (a) defining a set of exchange status signals each of which uniquely corresponds to a predetermined event that may take place during an AMIS Analog Message Delivery Session; (b) associating each exchange status signal with a set of process control signals for driving a set of predefined processes; (c) translating a given exchange status signal into its associated set of process control signals; and (d) driving the processes in the set of predefined processes utilizing the set of process control signals.

In an alternate embodiment of the invention, a method (and corresponding apparatus) for coordinating and controlling the operation of a voice messaging system network that supports the AMIS Analog protocol in response to a predefined event occurring during an AMIS Analog Message Delivery Session, comprises the steps of: (a) identifying the occurrence of the event during the Session;(b) generating a status signal to signify the occurrence of the event; (c) logically associating the status signal with a set of predefined processes to be performed upon the occurrence of the event; and (d) executing the set of predefined processes whenever the status signal is generated.

Furthermore, in the context of the aforementioned alternate embodiment of the invention, the step of logically associating further comprises the step of translating the status signal into a set of process control signals used to drive the set of predefined processes; where the set of process control signals are stored as an entry in a data structure with the status signal being used as a key into the data structure to retrieve the set of process control signals.

According to a preferred embodiment of the invention the data structure is a table and the key is an index into the table.

As indicated hereinabove, the invention also contemplates apparatus for performing the various methods taught herein. Such apparatus may, as will be recognized by those skilled in the art, take the form of a digital computer programmed to execute software designed to implement the various processes described in detail hereinafter; utilizing data structures which logically associate status signals with a set of process control signals that may be used to drive a set of predefined processes called for by either a protocol being supported, the local VM system, or both.

The invention features methods and apparatus for cataloging events that may take place during an AMIS Analog Message Delivery Session; coordinating and controlling a set of specific actions related to the specific reason that a status signal is generated during an AMIS Analog Message Delivery Session; logically consolidating the aforementioned set of specific actions; and simplifying the interface to software which perform the required actions.

These and other objects, embodiments and features of the present invention and the manner of obtaining them will become apparent to those skilled in the art, and the invention itself will be best understood by reference to the following Detailed Description read in conjunction with the accompanying Drawing.

BRIEF DESCRIPTION OF THE DRAWING

FIG. 2 illustrates, in the form of a time line, a set time intervals over which Originating site oriented tasks related to delivering a message take place during an illustrative AMIS Analog Message Delivery Session.

FIG. 3 illustrates, in the form of a time line, a set time intervals over which Destination site oriented tasks related to delivering a message take place during the same illustrative AMIS Analog Message Delivery Session depicted in FIG. 2.

FIG. 4 illustrates, in the form of a time line, a set of time intervals over which Originating site oriented tasks related to delivering a a plurality of messages takes place during an illustrative AMIS Analog Message Delivery Session.

FIG. 5 depicts an illustrative example of a data structure that may be used by the methods and apparatus contemplated by the invention as part of a process for translating a status signal into a set of process control signals that are in turn used to drive a set of predefined processes. The data structure depicted in FIG. 5 is sometimes referred to hereinafter as an AMIS Transmission Status Table (ATST).

FIG. 6 depicts, in the form of a flow chart, an illustrative process contemplated by the invention for coordinating and controlling the operation of a voice messaging system network, that supports the AMIS Analog protocol, in response to a Message Delivery Session status signal.

FIG. 7 depicts, in the form of a flow chart, an alternate illustrative process contemplated by the invention for coordinating and controlling the operation of a voice messaging system network, that supports the AMIS Analog protocol, in response to a Message Delivery Session status signal.

DETAILED DESCRIPTION

Figure 1:
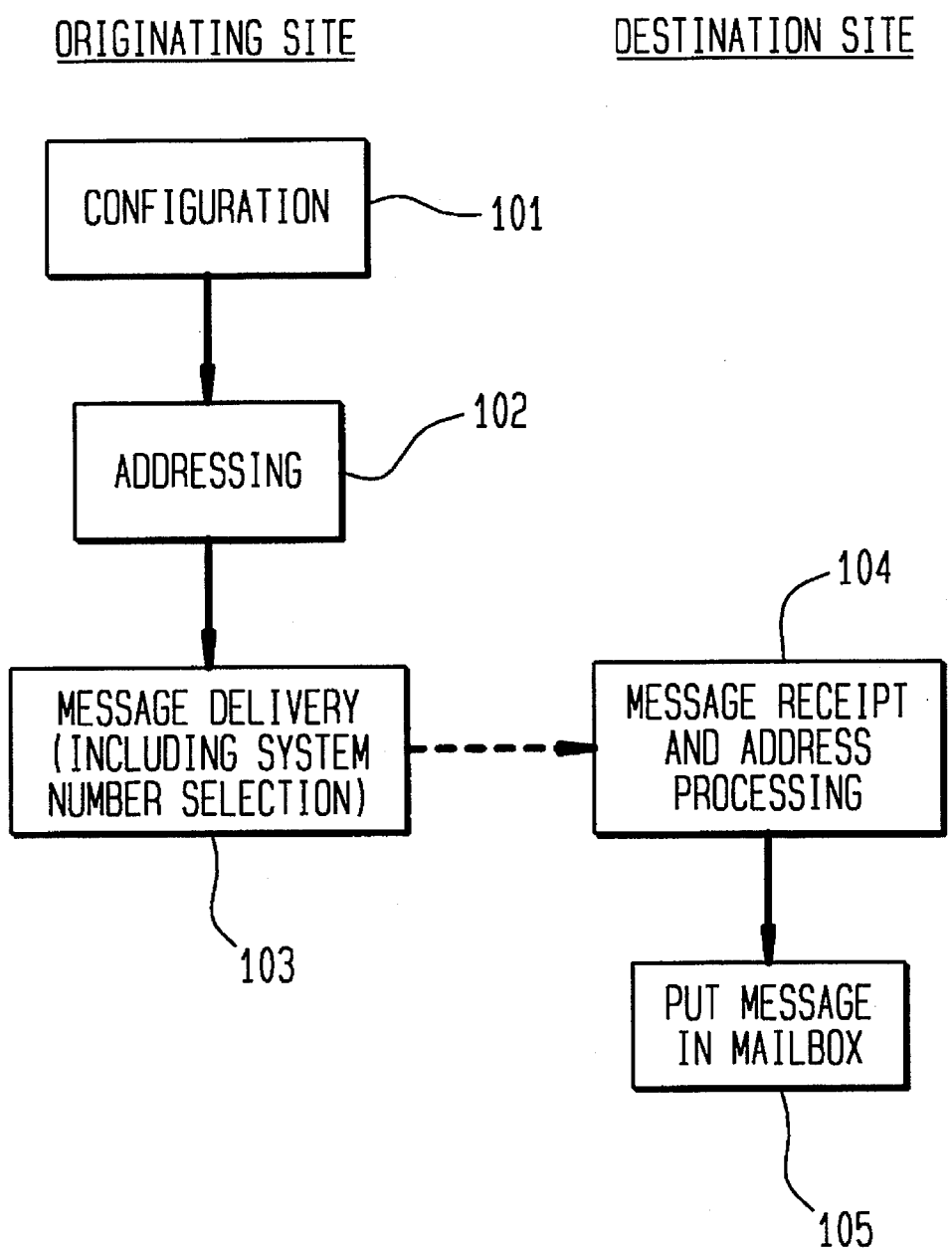
FIG. 1 illustrates, in the form of a block diagram, an overview of the basic steps involved in transmitting a message over a voice mail system network, from a user at an Originating site to a mailbox at a Destination site.

As indicated hereinbefore, the methods and apparatus to be described hereinafter will, for the sake of illustration only, be explained in terms associated with sending AMIS messages over voice messaging system networks supporting the AMIS Analog Protocol. Those skilled in the art will readily appreciate that the present invention may be used to coordinate and control VM system networks supporting other protocols that require specific sets of actions to be taken in response to a predefined set of status signals.

In particular, continued reference will be made to the commercially available PhoneMail VM system which supports the AMIS Analog protocol and allows voice messaging to take place over a PSTN or TIE network between users located at existing network sites. Each "site" is a potential point of origin and/or a destination on the network for a message; its address is defined by that network's numbering plan. Each user is the individual party at a site sending or receiving a message; the user's address is defined locally.

It should be noted from the outset that a Universal Addressing scheme which may be employed in illustrative voice messaging system networks in which the present invention may be practiced, is described in patent application Ser. No. 07/679,376, U.S. Pat. No. 5,287,498, assigned to the assignee of the present invention, entitled "Method And Apparatus For Addressing Users In A Network", filed on Apr. 2, 1991. The aforementioned Patent Application is hereby incorporated by reference.

For AMIS applications (and any other context within which the present invention may prove useful), each local site needs to be configured to provide some general information. It (the local site, also referred to herein as an Originating site), needs, for example, to define its own network address for transmission to a Destination site and identify whether this is a PSTN or TIE line number.

The required configuration data (i.e., type of data) is the same independent of the remote site (Destination site) being accessed and is referred to herein as the Site Address (i.e., the address of the Originating site). The AMIS Analog Protocol, as described in the incorporated publication, provides a means to indicate via the data format whether the Site Address is a PSTN or TIE line number.

Before describing the methods and apparatus contemplated by the invention, an overview of the basic steps involved in transmitting a message over a voice mail system network, from a user at an Originating site to a mailbox at a Destination site, will be described with reference to FIG. 1.

In particular, FIG. 1 illustrates that each site on the network (presumably all of which have the capacity to be an "Originating" site for a message), needs to be configured with, at a minimum, the information indicated hereinabove. This is shown in FIG. 1 at the block 101 labeled "Configuration".

An exemplary process for performing the configuration step to supply the address of the Originating site and an indication of whether the Site Address is a PSTN or TIE line number is described in patent application, Ser. No. 08/062,511, assigned to the assignee of the present invention, entitled "Methods And Apparatus For Providing An Enhanced Addressing Capability And For Supporting System Number Construction And Utilization In A Network Of Voice Messaging Systems Supporting The AMIS Analog Protocol", filed on May 11, 1993. The aforementioned Patent Application is hereby incorporated by reference.

Block 102 in FIG. 1 illustrates the essential step of "Addressing". That is, a user at the local site adding an address to a message to target the message to a particular "destination" system and mailbox on the network.

In general, techniques for addressing messages in voice mail systems are well known to those skilled in the art. Sophisticated techniques for performing the addressing function, such as the Universal Addressing scheme set forth in the aforementioned incorporated Patent Application, are also meant to be included among the type of functions represented as being performed at block 102 in FIG. 1.

FIG. 1 goes on to illustrate that a message that is properly addressed must be delivered from the Originating site to the Destination site (indicated as functionally taking place at blocks 103 and 104 of FIG. 1), and after being received, the target user address (mailbox) must be ascertained as part of address processing (shown taking place at block 104 as well), with the message ultimately being delivered to the user's mailbox as shown at block 105.

All of the aforementioned steps which are well known in the art, and improved techniques for performing them, are set forth in the incorporated patent application Ser. No. 08/062,511.

Having described, with reference to FIG. 1, an overview of the basic steps involved in transmitting a message over a voice mail system network, the methods and apparatus contemplated by the instant invention will now be described with reference to FIGS. 2–7.

First, reference should be made to FIGS. 2–4 which, as indicated hereinabove, illustrate in the form of time lines: (a) a set time intervals over which Originating site oriented tasks related to delivering a message take place during an illustrative AMIS Analog Message Delivery Session; (b) a set time intervals over which Destination site oriented tasks related to delivering a message take place during an illustrative AMIS Analog Message Delivery Session; and (c) a set of time intervals over which Originating site oriented tasks related to delivering a plurality of messages takes place during an illustrative AMIS Analog Message Delivery Session.

The AMIS Analog Message Delivery Session time intervals depicted in FIGS. 2–4 (to be described in detail hereinafter), and the types of events that can occur during these intervals, are well known by those skilled in the art. Nevertheless, for the sake of completeness the depicted time intervals and an indication of the types of events that can occur during each interval (some of which have been illustrated hereinbefore), will be described hereinafter in order to provide an understanding of the context in which the present invention finds utility.

It is assumed that a message has been recorded, addressed and scheduled for delivery via a network (like PhoneMail) that supports the AMIS Analog protocol. The Originating system then calls the Destination system to start the process of actually transmitting the message over the network as explained hereinbefore with reference to FIG. 1, and as taught, for example, in incorporated patent application Ser. No. 08/062,511.

The overall AMIS Analog Message Delivery Session for the transmission of the aforementioned message (from the Originating system's point of view), is illustrated in FIG. 2 as starting at time $T_1$ and ending at time $T_2$, where $T_1$ is the time that an attempt to make a call commences, and $T_2$ is the time when the Originating system hangs up.

Time interval $T_a$ thru $T_b$ (where $T_a$ typically coincides with $T_1$, although shown separated in FIG. 2 for the sake of specifically calling out this time interval), represents the "call set up" time interval, i.e., the time interval during which the Originating system calls the destination system; the Destination system answers; and handshake signalling takes place (utilizing well known techniques) to indicate successful call set up and that the protocol exchange (including actual message transfer) can begin.

Time interval $T_c$ thru $T_d$ illustrates the protocol exchange time interval, a portion of which is shown used to deliver the message per se. The actual message transmission time interval is represented as time interval $T_m$ thru $T_n$ (a subinterval of interval $T_c$–$T_d$) in FIG. 2.

Reference should now be made to FIG. 3 which illustrates time intervals $T_1$–$T_2'$; $T_a$–$T_{b'}$; $T_{c'}$–$T_{d'}$; and $T_{m'}$–$T_{n'}$. These time intervals are shown slightly skewed with respect to corresponding time intervals $T_1$–$T_2$; $T_a$–$T_b$ ; $T_c$–$T_d$; and $T_m$–$T_n$ in FIG. 2, where (from the Destination system's point of view): (a) the interval from the time a call is received thru call hang up is $T_1$–$T_{2'}$; (b) call set up takes place during $T_a$–$T_{b'}$; and (c) the protocol exchange and actual message data exchange intervals respectively take place during time intervals $T_{c'}$–$T_{d'}$; and $T_{m'}$–$T_{n'}$.

As indicated hereinbefore, the protocol exchange used in the illustrative Phonemail network includes the following well known subtasks: (a) start session data frame transmission/acknowledgement; (b) originating system ID transmission/acknowledgement; (c) message information transmission/acknowledgement; (d) actual message transmission from the originating system to the destination system, including receipt acknowledgement; and (e) sign off.

Tasks (a)–(e), from the Originating system's point of view, all normally take place in time interval $T_c$–$T_d$ ($T_{c'}$·$T_{d'}$ for the Destination system); with task (d), again from the Originating system's point of view, taking place during subinterval $T_m$–$T_n$ ($T_{m'}$–$T_{n'}$ for the Destination system).

As previously described, the protocol prescribes specific actions to be taken by the supporting VM system network whenever a message is not delivered. The actions taken depend on the reason for the message delivery failure during a given Message Delivery Session; with the actions being (1) attempt a redelivery, or (2) return the message and indicate to the user the reason for non-delivery.

The aforementioned PhoneMail implementation of the AMIS Analog protocol also requires that statistics associated with AMIS message exchanges be gathered and that a detailed log, which tracks messaging activity, be maintained.

As previously indicated (in the illustrative PhoneMail context), if a single message scheduled for delivery encounters a problem (such as a busy line, full mailbox, etc.) at any time during the Session (call set up or protocol exchange, including message transmission), a status signal is generated. A status signal is also generated by PhoneMail whenever a message is successfully delivered.

Accordingly, (a) a status signal that needs to be processed by the Originating system may be generated as a result of an event occurring at any time between $T_1$ and $T_2$; and (b) a status signal that needs to be processed by the Destination system may be generated as a result of an event occurring at any time between $T_{1'}$ and $T_{2'}$;

As previously noted, in accordance with the AMIS Analog protocol, VM systems such as Phonemail allow for the possibility of sending two or more messages after the AMIS Analog Message Delivery Session communications link is established by the call set up process taking place during time intervals $T_a$–$T_b$ and $T_a$–$T_{b'}$, for the Originating and Destination systems respectively. In this environment at least one status signal is generated for each message.

Reference should now be made to FIG. 4 which illustrates a set of time intervals over which Originating site oriented tasks related to delivering a plurality of messages takes place during an illustrative AMIS Analog Message Delivery Session. It should be noted that FIG. 2 and FIG. 4 are similar. FIG. 4, however, includes time intervals $T_{m1}$–$T_{n1}$ and $T_{m2}$–$T_{n2}$ during which separated messages can be delivered from the Originating system to the Destination system after call set up. Call set up is shown taking place during the interval $T_a$–$T_b$ (as in FIG. 2); while the protocol exchange associated with the first message begins at $T_{c1}$ and the protocol exchange associated with the second message begins at $T_{c2}$. If both messages are successfully delivered, the protocol exchange is depicted as ending at $T_d$, with hang up occurring at $T_2$ (which would be identical to $T_d$ in the exemplary case where the second message is successfully delivered).

As indicated hereinbefore, in the illustrative PhoneMail context in which the invention is being described, a Message Delivery Session that includes the scheduled delivery of two or more messages may continue after the failure to deliver a given message so long as no redelivery action (i.e., a retry at delivering the failed message) is indicated by the protocol or locally defined rules. Otherwise, the Message Delivery Session ends with the failed message.

Those skilled in the art will readily appreciate that other processing scenarios may exist or be conceived that do not operate in accordance with PhoneMail rules, but which nevertheless will benefit from the present invention. In other words, it should be kept in mind that the invention is directed to methods and apparatus for controlling and coordinating actions that depend on events that occur during a Message Delivery Session, where the specific actions taken (or the order in which they are taken) may vary from one VM system to another and do not affect the scope or spirit of the invention.

Reference should now be made to FIG. 5 which, as indicated hereinbefore, depicts an illustrative example of a data structure that may be used by the methods and apparatus contemplated by the invention as part of a process for translating a status signal into a set of process control signals that are in turn used to drive a set of predefined processes. The data structure depicted in FIG. 5, according to a preferred embodiment of the invention, is a table that is, as previously indicated, sometimes referred to herein as an AMIS Transmission Status Table (ATST).

This preferred data structure (the ATST) is comprised of a set of fields (with each field shown as a row in the illustrative table depicted in FIG. 5), where each field represents a set of desired action items (actually a set of predefined processes for implementing the desired actions). The depicted table data provides sufficient information to "drive" (i.e., select and/or provide inputs to) the set of predefined processes which are associated with a given status signal.

There is a row in the ATST for each defined status signal (which, as indicated hereinbefore, may be generated at any time during an AMIS Analog Message Delivery Session of the type described with reference to FIGS. 2–4); where the elements of a given row effectively constitute a set of process control signals that are in turn used to drive a given set of predefined processes (with each process corresponding to a column in the illustrative table).

What follows is a more detailed description of the table, its index, and the scheme to determine the index; and how the ATST function may be implemented and used in commercially available VM systems such as PhoneMail. Those skilled in the art will readily appreciate that other data structures (other then a table per se), with different keys or indices may be utilized to realize the objectives of the invention.

In the illustrative commercially available PhoneMail context, the Message Delivery session activities (call set up and protocol exchange, including message delivery) between an originating system and a destination system, is managed by two programs: the Incoming AMIS Protocol Handler (INPH), and the Outgoing AMIS Protocol Handler (OUTPH).

When a message is successfully delivered or when an event occurs signifying a problem during an AMIS Analog Message Delivery Session, the architecture of the commercially available software is such that each of these programs (INPH and OUTPH) returns a unique number which corresponds to one of the aforementioned unique status signals. These signals may be thought of as describing the progress of a given Message Delivery Session.

A list of all status signals would be a complete catalog of every possible event that can occur during an AMIS Analog Message Delivery Session, for which some action (at some time) must be taken, be it as simple as recording a statistic, or as complex as attempting to resend the message, play prompts, etc.

An illustrative subset of the status signals defined in PhoneMail (and generated by either the OUTPH or INPH), is described hereinafter. Out of the many possibilities they have been chosen to illustrate various features of the invention.

For the OUTPH, a subset of the status signals defined include:
Human Answer: The AMIS call has been misdirected.
Busy: The remote destination is busy.
Disconnect: The destination has disconnected.
Network Down: The destination system is not accepting network calls.
Restricted Access: The destination system refuses AMIS calls from the originating system.
Mailbox Full: The destination system has rejected message delivery because the mailbox is full.
Mailbox Not Accepting: The destination system has rejected message delivery because the mailbox is not accepting messages.
Frame Error: The originating system receives notification that the destination system has detected a framing error.
Protocol Error: As above, but the error is a protocol error.
Message Sent: The message was transmitted to and accepted by the destination system.

For the INPH, a subset of the status signals defined include:
Message Received: The message was received from and acknowledgement sent to the originating system.
Originating Hang up: The originating system disconnected.
Our Disk Is Full: Incoming message could not be accepted because the disk was full.
Our Mailbox Full: Incoming message refused because the destination mailbox was full.
Protocol Violation: Originating system has violated protocol specifications.

For each defined status signal, decisions need to be made (in the illustrative PhoneMail context) regarding the actions described hereinafter. Within the PhoneMail AMIS Analog software architecture, a given status signal is treated as a parameter which, without the present invention, would have to be made available to the software executing the required actions. The present invention permits the use of independent software programs (the set of processes referred to herein) to process the different actions.

By using the present invention, the status signal parameter does not need to be supplied to each and every process for interpretation prior to initiating an action; rather, the status signal parameter is used as an index into a data structure (such as the table depicted in FIG. 5), to drive the set of predefined processes using the process control signals stored in the data structure. In effect, each status signal is translated into a set of process control signals which may then be used to directly drive the set of predefined processes.

In the illustrative PhoneMail context, the required AMIS actions, as indicated hereinbefore, are: (1) retrying message delivery, or (2) returning the message and indicating to the user the reason for non-delivery If AMIS message delivery cannot be completed, the protocol (described in the incorporated publication) specifies the circumstances under which a redelivery attempt may be made. It also details the circumstances under which the message should be returned to its creator without retrying. For example:

(a) if an AMIS protocol session cannot be initiated because the call cannot be completed the protocol recommends retrying message delivery. This could happen if the remote system is busy, the network is congested, or the remote system simply does not answer;

(b) if an AMIS session cannot be completed due to signalling errors (protocol violations, framing errors, timing errors) retries are permitted;

(c) if an AMIS protocol session cannot be initiated because the destination dialed is incorrect and a human answers, the protocol requires the message to be returned; and (d) if the destination mailbox is full, not accepting messages, or invalid the message is to be returned.

According to one aspect of the present invention, each status signal may be logically associated (using a data structure such as the table depicted in FIG. 5) with a retry indicator process control signal.

If a message is returned to its creator the protocol recommends that the creator be provided with some information about why the message was not delivered.

In PhoneMail this information is provided in the form of a voice message (referred to as a prompt) played for the user. PhoneMail prompts are all prerecorded and assigned a reference; the applicable prompt is then selected for play using the reference. In designing prompts the goal is to be concise and informative without supplying unnecessary and potentially confusing detail.

According to another aspect of the present invention, a given status signal may be logically associated (using a data structure such as the table depicted in FIG. 5) with a prerecorded prompt process control signal that drives a prompt process to select and play an appropriate message.

By utilizing the teachings of the present invention the flexibility is provided for designing and assigning different specific prompts to different call failure reasons, and/or designing and assigning general prompts to other call failure reasons.

Utilizing methods and apparatus contemplated by the invention also allows informative prompts to be consolidated within the data structure thereby enabling prompts associated with similar message delivery failures to be coordinated. This allows the number of prompts to be reduced in a logical way, that is in a way that does not result in losing the capacity to provide a specific reason for a specific call failure.

The set of process control signals associated with a given status signal may also be used to drive "finer grained" statistical recording and message logging processes as described hereinafter.

In Phone Mail statistics related to AMIS message delivery are maintained in order to provide the customer with information on AMIS call activity. In general, these statistics count such things as message delivery failures, messages sent and messages received. The statistics recorded may be of a predetermined "resolution"; that is providing the system user with more or less specific information regarding the reason for a message delivery failure than, for example, a given prompt.

It should be noted that in FIG. 5 prompt 230 is associated with several different status signals and hence the prompt in and of itself could not be used to distinguish between failure reasons such as "Busy"; "Disconnect"; "Frame Error" and "Protocol Error". It should also be noted that all of these specific errors, once a given status signal associated with the error is translated using the table depicted in FIG. 5, produce a process control signal (represented by the entry in the "Information Prompt" column in FIG. 5) that directs the prompt process to play prompt 230.

Although, as indicated hereinbefore, a list of all status signals would be a complete catalog of every possible event that can occur during an AMIS Analog Message Delivery Session, for which some action (at some time) must be taken; not all of these actions are relevant or even informative in describing call activity. It may be reasonable to group some activities (such as the "Error While Sending" statistic shown associated with both a Framing Error and Protocol Error in FIG. 5), or even ignore some in order to provide useful information regarding call activity.

Accordingly, the present invention may be used to provide a mechanism for coordinating statistics with information available concerning status events occurring during a given Message Delivery Session, and design meaningful statistics.

Further yet, the invention provides a mechanism for logging entries in a "fine grain" message log (compared with the aforementioned statistics and prompts), thereby providing for very detailed information to be collected concerning call activity.

For example, in PhoneMail certain activities related to an AMIS session are entered in a log: message created, retried, returned, sent, received. One field in the log entry supplies details via a code which describe the status of the protocol exchange. These codes are designed to be published in technical users guides along with detailed explanations.

By utilizing the present invention to specify these codes, codes could be defined and grouped to make them easier to interpret and remember for experienced technicians. These codes may be defined and grouped independently of the way statistics are grouped.

In particular, FIG. 5 illustrates that the message log codes associated with a Frame Error and a Protocol Error, are different; even though the same statistic is logged.

In view of the above, it can be seen, with reference to FIG. 5, that by using a data structure and the techniques contemplated by the invention, a set of predefined status signals may be associated with (and ultimately be translated into), a set of process control signals which: (a) enable scheduling attempts to redeliver a message (when appropriate); (b) facilitate the playing of informative, yet concise prompts, some of which may be associated with a plurality of status signals; (c) enable a range of meaningful statistics to be accumulated; and (d) provide mechanism for collecting even more detailed information than provided by the set of defined statistics.

The idea that Retry, Prompt, Statistic and Message Log information can all be coordinated and accessed via a status determined during the AMIS protocol exchange is the key point. The actual logical format of the table and its data content is not relevant (and is described above only for illustration purposes).

It should be noted that if other actions are required for AMIS or any other protocol which the invention is called upon to support, the data structure format can be expanded to provide call progress specific information required by that action (by adding another column to provide a new process control signal for driving the process implementing a newly defined action when the data structure is a table of the form depicted in FIG. 5).

If additional status signals are defined, the data structure can be expanded as well (in effect by adding a new row when the data structure is a table of the form depicted in FIG. 5).

If new prompts, statistics, or message log codes are added, the table content can be modified to reference the new data as well.

Reference should now be made to FIG. 6 which, as indicated hereinbefore, depicts (in the form of a flow chart), an illustrative process for coordinating and controlling the operation of a voice messaging system network in response to a Message Delivery Session status signal. The VM system is assumed, for the sake of illustration only, to support the AMIS Analog protocol.

According to the specific illustrative aspect of the invention depicted in FIG. 6, the invention contemplates a process comprising the steps of: (a) defining a set of exchange status signals (shown occurring at block 601 of FIG. 6), each of which uniquely corresponds to a predetermined event that may take place during an AMIS Analog Message Delivery Session; (b) associating each exchange status signal with a set of process control signals for driving a set of predefined processes (shown occurring at block 602 of FIG. 6); (c) translating a given exchange status signal into its associated set of process control signals (shown occurring at block 603 of FIG. 6); and (d) driving the processes in the set of predefined processes utilizing the set of process control signals (shown occurring at block 604 of FIG. 6).

Reference should now be made to FIG. 7 which, as indicated hereinbefore, depicts (in the form of a flow chart), an alternate illustrative process contemplated by the invention for coordinating and controlling the operation of a voice messaging system network in response to a predefined event occurring during an AMIS Analog Message Delivery Session. Again, for the sake of illustration only, the VM system is assumed to support the AMIS Analog protocol.

According to the specific illustrative aspect of the alternate embodiment of the invention depicted in FIG. 7, the invention contemplates a process comprising the steps of: (a) identifying the occurrence of a predefined event during the Session (shown occurring at block 701 of FIG. 7); (b) generating a status signal to signify the occurrence of the event (shown occurring at block 702 of FIG. 7); (c) logically associating the status signal with a set of predefined processes to be performed upon the occurrence of the event (shown occurring at block 703 of FIG. 7); and (d) executing the set of predefined processes whenever the status signal is generated (shown occurring at block 704 of FIG. 7).

It should be noted that, according to a preferred embodiment of the invention, the step of logically associating (shown occurring at block 703 of FIG. 7), further comprises the step of translating the status signal into a set of process control signals used to drive the set of predefined processes, where the set of process control signals are stored as an entry in a data structure (such as the ATST depicted in FIG. 5), with the status signal being used as a key into the data structure to retrieve the set of process control signals.

Finally, as indicated hereinbefore, it should be noted that the invention also contemplates apparatus for performing the various methods taught herein. Such apparatus may, as will be clearly recognized by those skilled in the art, take the form of a digital computer programmed to (a) execute software designed to implement the various processes described in detail hereinbefore; and (b) utilize data structures, of the types described herein, which logically associate status signals with a set of process control signals that may be used to drive a set of predefined processes called for by either a protocol being supported, the local VM system, or both.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. A method for responding to a second coded signal in an internetwork of voice messaging networks, said voice messaging networks having dissimilar internal operating procedures and protocols, said internetwork implementing a common internetwork protocol to enable a plurality of voice messaging functions to be implemented between said networks, said common protocol operating to permit a first of said networks to establish a communications link with a second of said networks for executing at least one of said voice messaging functions on an internetwork basis through an exchange of a first coded signal and said second coded signal selected from a plurality of predefined coded signals, said first coded signal being transmitted by said first network to said second network and said second coded signal being transmitted by said second network to said first network via a sequence of Dual Tone Multi-Frequency (DTMF) tones having a known relationship to each said coded signal, the method comprising the steps of:

(a) defining a subset of said plurality of predefined coded signals such that each coded signal composing said subset is characterized as being associated with a respective plurality of processes to be implemented in said first network participating in said internetwork voice messaging;

(b) defining said plurality of processes to be implemented by said first network in response to each of said predefined coded signals composing said subset;

(c) said first network recognizing said second coded signal sent by said second network, said first network logically associating said second coded signal with a set of process control signals for driving said plurality of processes; and (d) said first network translating said second coded signal into its associated set of process control signals.

2. The method as set forth in claim 1 further comprising the step of driving said plurality of processes utilizing said set of process control signals.

3. The method as set forth in claim 2 wherein said plurality of processes includes a process for taking an action required by said common internetworking protocol.

4. The method as set forth in claim 3 wherein one of said plurality of processes attempts to redeliver a message in accordance with said common internetworking protocol.

5. The method as set forth in claim 1 wherein said set of process control signals includes a retry message delivery signal for driving one of said plurality of processes.

6. The method as set forth in claim 1 wherein said plurality of processes includes a process for playing a prerecorded prompt.

7. The method as set forth in claim 6 wherein said set of process control signals includes a prompt specification signal for driving said process for playing a prerecorded prompt.

8. The method as set forth in claim 1 wherein said plurality of processes includes a process for keeping track of predefined internetworked messaging function statistics.

9. The method as set forth in claim 1 wherein said plurality of processes includes a process for maintaining a message log.

10. The method as set forth in claim 1 wherein said step of translating further comprises the step of utilizing said status signal as an index into a process control signal data set.

11. The method as set forth in claim 10 wherein said process control signal data set has a tabular format.

12. The method of claim 1, wherein said first network responds to said second coded signal from said second network by translating said second coded signal into its associated set of process control signals.

13. The method of claim 1 wherein said first network responds to a third coded signal from said second network by translating said third coded signal into its associated set of process control signals.

14. A method for coordinating and controlling a first voice messaging system network in an internetwork of voice messaging networks in response to a predefined event occurring during an internetworked voice messaging session carried out under a defined common internetwork protocol, said common protocol operating to permit one of said networks to establish a communications link with another of said networks for executing at least one function of said voice messaging session selected from a plurality of processes to be implemented by said first network through an exchange of coded signals selected from a plurality of predefined coded signals, comprising the steps of:

(a) identifying the occurrence of said event during said voice messaging session;

(b) generating a status signal to signify the occurrence of said event;

(c) logically associating said status signal with a set of process control signals for implementing one of a plurality of processes to be implemented in said first network; and (d) providing said status signal to said first network; and (e) executing said set of predefined processes whenever said status signal is received.

15. The method as set forth in claim 14 wherein said step of logically associating further comprises the steps of:

(a) storing said set of process control signals as an entry in a data structure; and (b) utilizing said status signal as a key into said data structure to retrieve said set of process control signals.

16. The method as set forth in claim 15 wherein said data structure is a table and said key is an index into said table.

17. A method for a first messaging network to respond to a first event in a message delivery session between said first network and a second messaging network, said message delivery session being executed in accordance with a predefined communication protocol, said predefined protocol defining said first event and a second event, said first event being identified by a first status signal, said second event being identified by a second status signal, said first event being detected by said second messaging network, said second messaging network generating said first status signal in response to the detection of said first event, said second messaging network sending said first status signal to said first messaging network, said method comprising the steps of:

(a) generating, by said first messaging network, a first number to represent said first status signal;

(b) applying, by said first messaging network, said first number as an index to a data structure to generate a first process control signal and a second process control signal, said data structure containing said first process control signal, said second process control signal, a third process control signal and a fourth process control signal, said first process control signal and said third process control signal representing values for a parameter of a first predefined process, said second process control signal and said fourth process control signal representing values for a parameter of a second predefined process, said first process control signal and said second process control signal being generated when a second number is applied as an index, said second number representing said second status signal;

(c) executing, by said first messaging network, said first predefined process using said first process control signal as a parameter; and (d) executing, by said first messaging network, said second predefined process using said second process control signal as a parameter.

18. The method of claim 17, wherein said first status signal and said second status signal are dual tone multi-frequency signals.

19. The method of claim 18, wherein said predefined communication protocol comprises an analog protocol.

20. The method of claim 19, wherein said first event comprises the transmission of a message from said first messaging network to said second messaging network.

21. The method of claim 20, wherein said first predefined process provides an information prompt, said second predefined process records message delivery statistics, said first process control signal specifies a prompt indicating that a call could not be completed, and said second process control signal specifies a statistic indicating that a destination is busy.

* * * * *